Dec. 13, 1966  H. W. NORTH  3,291,542
JOURNAL BEARING

Filed March 6, 1964  2 Sheets-Sheet 1

INVENTOR
Henry W. North
BY
ATTORNEYS

Dec. 13, 1966   H. W. NORTH   3,291,542
JOURNAL BEARING
Filed March 6, 1964   2 Sheets-Sheet 2
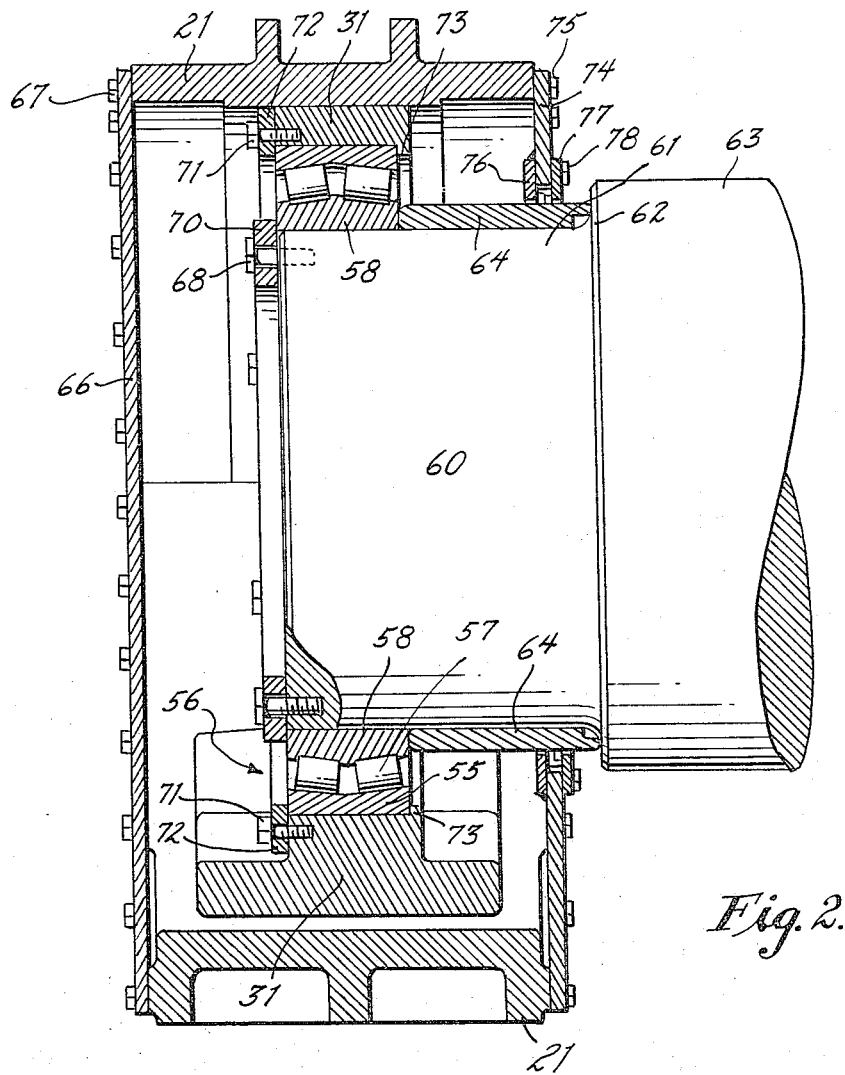
Fig. 2.
Fig. 3.
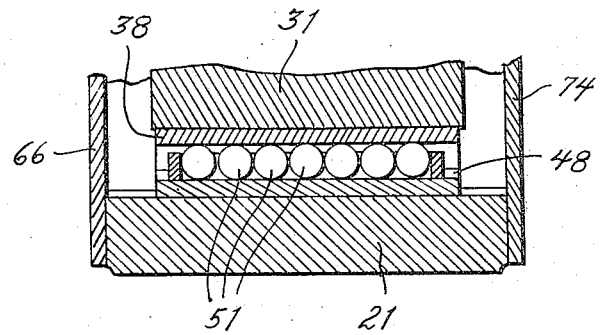
INVENTOR
Henry W. North
BY
ATTORNEYS

United States Patent Office 3,291,542
Patented Dec. 13, 1966

3,291,542
JOURNAL BEARING
Henry W. North, Reading, Pa., assignor to Birdsboro Corporation, Birdsboro, Pa., a corporation of Pennsylvania
Filed Mar. 6, 1964, Ser. No. 349,860
5 Claims. (Cl. 308—6)

The present invention relates to bearings and more particularly to journal bearings enclosed in journal boxes.

A purpose of the invention is to employ in a journal bearing fully enclosed roller foot bearings which are inclined toward one another.

A further purpose is to provide roller foot bearings for antifriction support in a journal box which allow free endwise movement of the journal for expansion and contraction.

A further purpose is to employ inclined roller foot bearings which can be completely enclosed within the journal box for protection against dust and dirt and for retention of lubricating oil or grease about the bearing.

A further purpose is to provide supporting foot bearings which are disposed at an angle with respect to the vertical axis of the journal box to provide a self-centering effect and to resist a moderate amount of side loading which may be encountered in service.

A further purpose is to use an inner housing for supporting the shaft radially and longitudinally and an outer housing for supporting the inner housing radially and longitudinally wherein the outer housing is stationary and the inner housing is free to translate longitudinally with respect to the outer housing.

A further purpose is to use an outer housing to fully enclose a longitudinally moving inner housing which radially supports a shaft.

Further purposes appear in the specification and in the claims.

In the drawings I have chosen to illustrate a few only of the numerous embodiments in which my invention may appear, selecting the forms shown from the standpoints of convenience in illustration, satisfactory operation, and clear demonstration of the principles involved.

FIGURE 2 is a longitudinal vertical section of the bearing taken on line 2—2 of FIGURE 1.

FIGURE 3 is an inclined longitudinal section of the foot bearing taken on the line 3—3 of FIGURE 1.

Figure 1:
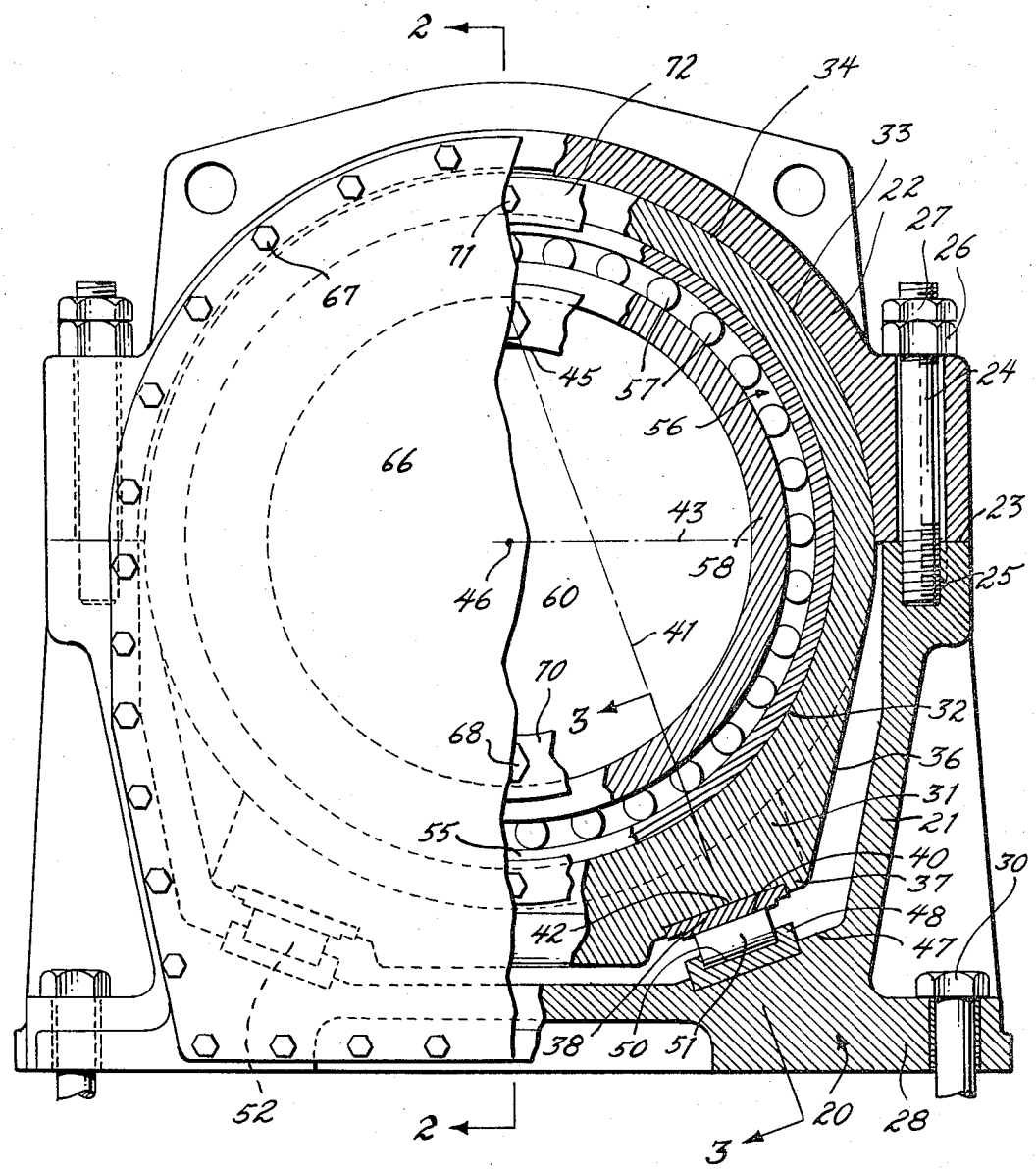
FIGURE 1 is an end elevation of the bearing of the invention with the outer housing cover partially broken away and the bearing and housings partially sectioned.

Describing in illustration but not in limitation and referring to the drawings:

Efforts have been made to use antifriction bearings in structures such as furnaces or converter vessels that are rotated in use. These structures include the oxygen blowing types of furnaces wherein a cylindrical structure is rotatably supported from horizontally extending trunnions journalled in bearings. Antifriction bearings for this purpose have in the past been extremely bulky and difficult to protect against dust and dirt and to enclose with lubricating oil or grease. Additionally, efforts to compensate for longitudinal movement of the trunnions which results from expansion and contraction of the furnace while providing for radial support of the journal have not yielded satisfactory results.

The present invention provides for antifriction support to the journal or trunnion both radially and longitudinally by utilizing an inner and an outer housing wherein the outer housing supports the inner housing both radially and longitudinally and the inner housing supports the trunnion radially and longitudinally but prevents relative longitudinal movement between the trunnion and the inner housing.

In the present invention, roller ladder or foot bearings are inclined toward one another in a direction transverse to their longitudinal axes and extended between the outer and inner housing. These bearings support the inner housing and provide a self-centering effect on the inner housing from the outer housing while allowing relative longitudinal movement between the housings.

Referring now to the drawings, I show a housing 20 having a lower half 21 and an upper half 22 having matting surfaces 23. Halves 21 and 22 are held together by studs 24 threaded into the lower half at 25 and having nuts 26 engaging the studs at their upper end with lock nuts 27 locking the nuts 26. The housing 20 has suitable extensions 28 which receive anchor bolts 30 for securing the housing to a base. Supported within housing 20 is an inner housing 31 generally cylindrical in shape having a radial inner surface 32 and a radial outer surface 33 extending over the outer upper half of the inner housing 31. The surface 33 forms a sliding bearing with the inner surface 34 of the upper half 22 of outer housing 20. Surfaces 33 and 34 are of similar shape.

The lower half of inner housing 31 is such as to diverge at 36 tangentially outward from a circle which would be a continuation of surface 33, to form shoulders 37 which support bearing inserts 38 having flat bearing surfaces 40. The longitudinal axis of the bearing surface 40 extends parallel to the longitudinal axis of the shaft being journalled. The surfaces 40 are disposed at an incline with respect to the vertical so that a normal line 41 drawn through the longitudinal center of the bearing insert at 42 intersects the vertical center line of the bearing and the shaft supported within the bearing at an oblique angle. The point of intersection of line 41 with respect to the vertical center line of the shaft is center line 43 at for instance 45 or permissibly at the center of the shaft at 46, or below the horizontal center line.

Outer housing 20 has an inclined surface 47 which carries a bearing insert 48 having a bearing surface 50 extending in a plane parallel to the bearing surface 40. Suitable roller bearings 51 act to support the inner housing 31 from the outer housing 47 and permit relative longitudinal movement between housings 31 and 47 while restraining rotational movement and providing a self-centering effect between housings 21 and 30.

A similar bearing arrangement to that described exists at 52 in the lower left quadrant of the housings as viewed in FIGURE 1 wherein the incline of the bearings 51 angularly of the housing are such that they intersect the vertical center line through the shaft at the same point as that of the described bearing as at 45 in FIGURE 1, so that the bearings 51 and 52 extend symmetrically with respect to the shaft. Thus, it will be seen that housing 31 is cradled within housing 20 so that housing 31 can move longitudinally over the antifriction bearings 51 and 52 but the incline of the bearings one toward another provide a self-centering effect for the inner housing 31 which restrains rotation of housing 31.

The inner housing 31 has retained therein by for instance a force fit the outer raceway 55 of roller bearing 56. Rollers 57, as best seen in FIGURE 2, are supported by raceway 55 and in turn angularly support the inner raceway 58 secured as by a wedge fit to trunnion or shaft 60 having journal portion 61, shoulder 62 and the shaft proper 63. Spacer 64 suitably is fitted on reduced portion 61 and rotates therewith and spaces inner raceway 58 a suitable distance from shoulder 62. End plate 66 is attached to outer housing 21 by studs 67 and completely encloses the end of housing 21. Secured to the shaft 60 by means of studs 68 is a retainer plate 70 which serves to securely hold inner raceway 58 against spacer 64. Studs 71 secure outer retaining plate 72 to inner housing 31 to hold outer raceway 55 securely against flange 73 of inner housing 31. The shaft is fully enclosed at its inward end by plate 74 secured to outer housing by studs 75 with plate 74 having at its radially inward end a suitable rotary seal 79 enclosed between an inner flange 76 and an outer retainer plate 77 secured by studs 78 which prevents leakage of lubricant between seal 79 and spacer 64. It will be seen that the outer housing 20, end plate 66, inner plate 74, and seals 76 and 77 serve to form about the end of shaft 60 a journal box which fully encloses bearings 51 and 56 to retain grease about and exclude dirt from the bearings.

In operation, the radial load of shaft 60 is transmitted from portion 61 through bearing 56 to the inner housing 31. Shaft 60 is restrained from movement longitudinally with respect to inner housing 31 by the incline of rollers 56 and 57 as is well known. The bearings 57 allow shaft 60 to rotate with respect to inner housing 31 with only rolling friction. Inner housing 31 is in turn supported from outer housing 20 by means of ladder or foot bearings 51 and 52. An important feature of the invention is the incline of the ladder bearings with respect to the vertical whereby inner housing 31 is supported from outer housing 20 so that inner housing 31 is supported and restrained and self-supported rotationally while movement longitudinally is permitted between inner housing 31 and outer housing 20. In addition, both roller bearings 56 and ladder bearings 51 are fully enclosed in the manner described above.

It should be understood that although only one pair of opposed ladder or foot bearings are shown, in alternate embodiments a plurality of pairs of ladder bearings, each pair inclined toward one another at the same angle from the vertical, could be used to obtain additional longitudinal and angular support of the inner housing.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a journal bearing for supporting a generally longitudinally extending journal, an outer housing extending longitudinally of the journal having a semi-cylindrical upper inner surface, first support surfaces on the outer housing lower inner surface for supporting ladder roller bearings, an inner housing extending within the outer housing having a semi-cylindrical upper outer surface slidably bearing against the upper inner surface of the outer housing and second support surfaces on the inner housing outer lower surface for supporting ladder bearings, a pair of ladder bearings between said first and second support surfaces, said first and second surfaces being inclined to the horizontal wherein each of said pair of ladder bearings extends longitudinally parallel to the journal and transversely inclined toward the other of said pair of ladder bearings and a line normal to each of said pair of ladder bearings and passing through their respective longitudinal axis intersect the vertical center line of the journal at a common point, and a radial bearing extending concentrically within and supported by the inner housing adapted to support an inner rotating means.

2. A journal bearing of claim 1, wherein the common point of intersection of the lines normal to the ladder bearings is above the horizontal center line of the journal.

3. A journal bearing of claim 1, wherein the common point of intersection of the lines normal to the ladder bearings is at the horizontal center line.

4. A journal bearing of claim 1, wherein the outer housing includes end plates whereby the outer housing fully encloses the inner housing, ladder bearings, radial bearing semi-cylindrical surfaces of the inner and outer housings, and journal.

5. A journal bearing of claim 1, wherein the outer housing is split horizontally whereby the upper outer housing can be drawn toward the lower outer housing to securely keep the inner housing in bearing relationship to the outer housing.

References Cited by the Examiner
UNITED STATES PATENTS

| | | | |
|---|---|---|---|
| 1,458,187 | 6/1923 | Hudson | 308—183 X |
| 1,747,609 | 2/1930 | Treschow | 308—73 |
| 1,879,357 | 9/1932 | Lindstrom | 308—74 |
| 2,556,317 | 6/1951 | Cook | 308—143 |
| 2,621,086 | 12/1952 | King | 307—72 X |
| 2,964,250 | 12/1960 | Asplund | 208—176 X |
| 2,976,090 | 3/1961 | McFeaters | 308—6 |
| 3,070,039 | 12/1962 | Mohr | 308—245 X |
| 3,170,737 | 2/1965 | Denne | 308—59 |

MARTIN P. SCHWADRON, *Primary Examiner.*

DAVID J. WILLIAMOWSKY, *Examiner.*

L. L. JOHNSON, *Assistant Examiner.*